United States Patent [19]

Wilson et al.

[11] 4,112,474
[45] Sep. 5, 1978

[54] CAPACITOR PROTECTIVE DEVICE

[75] Inventors: S. R. Wilson, Glens Falls; D. B. Jones, Hudson Falls, both of N.Y.

[73] Assignee: General Electric Company, Hudson Falls, N.Y.

[21] Appl. No.: 763,089

[22] Filed: Jan. 27, 1977

[51] Int. Cl.² ............................................. H02H 7/16
[52] U.S. Cl. .......................................... 361/15; 361/37; 361/272; 361/275
[58] Field of Search ....................... 361/15, 16, 17, 37, 361/38, 105, 275, 272, 274; 200/81 R, 83 R, 83 D, 83 W; 340/236, 229, 253 E; 236/92 R; 174/11 R

[56] References Cited

U.S. PATENT DOCUMENTS

| | | | |
|---|---|---|---|
| 2,117,213 | 5/1938 | Rodanet | 200/83 W |
| 2,553,291 | 5/1951 | Barr | 361/37 |
| 2,796,575 | 6/1957 | Arnot | 361/92 X |
| 2,888,613 | 5/1959 | Cuttino | 361/17 |
| 3,553,542 | 1/1971 | Netherwood | 361/275 |

Primary Examiner—Patrick R. Salce
Attorney, Agent, or Firm—James J. Lichiello

[57] ABSTRACT

The invention relates to an indicator and/or interrupter circuit for an electrical capacitor. On the build-up of internal pressure in the capacitor a switch is caused to operate to open a set of contacts which thereby energizes an indicating lamp to provide a visual indication of a failed or over-pressure condition in the capacitor. The opening of the switch may also cause an interruption of current flow through a holding coil and this current interruption causes a circuit interrupter to operate mechanically and thereby remove the capacitor from its circuit.

7 Claims, 4 Drawing Figures

CAPACITOR PROTECTIVE DEVICE

BACKGROUND OF THE INVENTION

This invention relates to a capacitor protective device and more particularly to a protective device and circuit for large power capacitors.

Larger power capacitors were previously filled with a dielectric fluid referred to as a polychlorinated biphenyl. The polychlorinated biphenyls were considered to be essentially non-inflamable. Accordingly, in the unlikely event of a capacitor failure due to perhaps internal arcing and a violent rupture of the capacitor case, the polychlorinated biphenyls would not support combustion and flame problems were minimized. Recently, however, changing conditions have brought about the use of new dielectric liquids in large power capacitors. Many of these new fluids do not have the non-flammability characteristics of the PCB's and therefore support combustion and increase fire hazards in the event of a rupture of a capacitor. A desirable protective device and circuit for a large power capacitor would include an arrangement whereby a visual signal is given to the operating people involved that a capacitor is nearing failure and also an arrangement by which the capacitor is disconnected from the line circuit.

It is therefore an object of this invention to provide a protective device for large power capacitors which functions effectively to disconnect the capacitor from its electrical circuit in event of failure and also provide a visual indication of its failure. More importantly this invention provides a capacitor protective device which senses internal pressure of a capacitor and removes the capacitor from electrical circuit when the pressure increases and prior to its rupture.

SUMMARY OF THE INVENTION

In one preferred form of this invention a pressure sensitive switch mechanism is mounted in a capacitor wall to sense internal pressure. On the build-up of internal pressure in the capacitor the switch is caused to operate to open a set of contacts which thereby energizes an indicating lamp to provide a visual indication of a failed or over-pressure condition in the capacitor. The opening of the switch may also cause an interruption of current flow through a holding coil and this current interruption causes a circuit interrupter to operate mechanically and thereby remove the capacitor from its circuit.

DESCRIPTION OF THE DRAWINGS

This invention will be better understood when taken in connection with the following description and the drawings in which.

DESCRIPTION OF THE PREFERRED EMBODIMENTS

Figure 1:
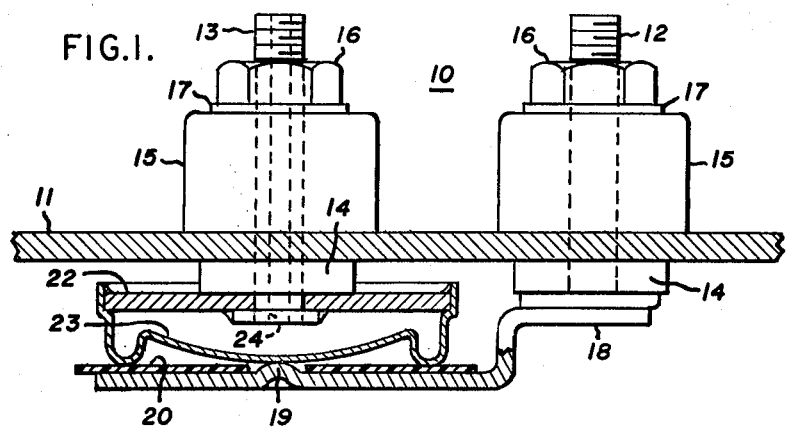
FIG. 1 is an illustration of a preferred pressure switch of this invention.

Referring now to FIG. 1 one preferred switch assembly is disclosed as switch assembly 10. Switch assembly 10 is adapted to be mounted in a power capacitor can or casing, the wall or cover of which is indicated as 11. Switch 10 comprises a pair of terminal members 12 and 13 which pass through the cover 11 and are insulated therefrom by insulating washers 14 at the underside of cover member 11, and insulating bushings 15 at the external surface of the cover 11. The terminals are fastened to the cover member 11 by means of nuts 16 which are threaded over terminals 12 and 13 and rest adjacent insulating washers 17. Terminal 11 has attached thereto electrical connecting member 18 which projects from terminal 12 and underlies terminal 13. Electrical conducting member 18 has included therein a suitable indentation or electrical contact 19 which resides just under terminal 13. Indentation 19 is surrounded by an electrically insulating washer or disc 20. At the underside of terminal 13 there is attached to the terminal 13 in electrically conducting relationship, a disc member 22. Disc member 22 has connected thereto a suitable electrically conducting diaphragm member 23. Diaphragm 23 is peripherally sealed to disc member 22 to provide a closed chamber therebetween. This closed chamber is vented to exterior conditions by means of a suitable aperture or channel 24 passing through terminal 13.

As can be seen from FIG. 1, in the event of over pressure conditions within the casing member as defined by cover 11, the diaphragm 23 is caused to flex away from electrical contact 19 to break a potential circuit between terminals 12 and 13. This circuit may be utilized to provide electrical control means or indication means of the pressure condition within the capacitor. This is best illustrated with respect to FIG. 2.

Figure 2:
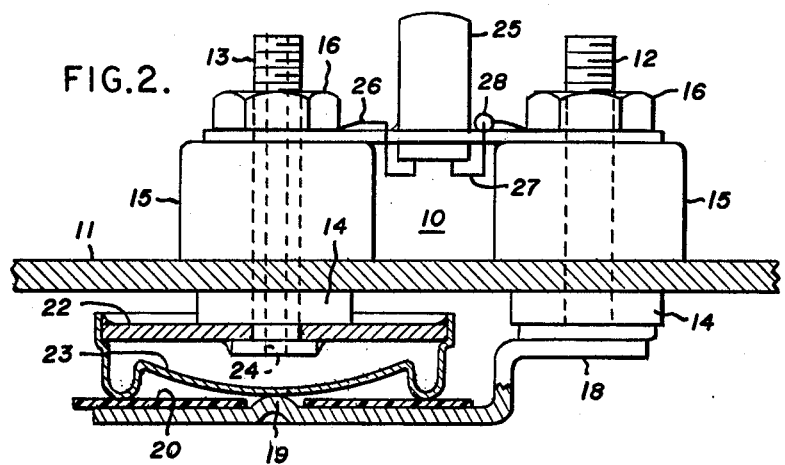
FIG. 2 is an illustration of a normally closed pressure switch having an indicating lamp connected thereto.

Referring now to FIG. 2 there is illustrated the pressure switch 10 of FIG. 1 having connected between the terminals 12 and 13 a neon indicating lamp 25. This lamp 25 is connected to terminal 13 by means of a lead 26 and to terminal 12 by means of a lead 27 having a resistor 28 connected therein. Resistor 28 is employed to limit the amount of current flowing through the neon lamp 25 since lamp 25 only requires a very small current to be operative. As is understood from FIG. 2, when the pressure switch is in its operative condition, i.e., when the diaphragm 23 makes electrical contact with contact 19, current flows through the terminal 12, switch contact 19 and diaphragm 23, and terminal 13, and the indicating lamp 25 remains unenergized because there is no potential difference between leads 26 and 27 to operate the lamp. At such time as the diaphragm 23 moves away from contact 19 and thereby interrupts the circuit between the terminals, then sufficient current flows through the lamp 25 to energize the lamp. Obviously, it can be seen that any number of different kinds of pressure sensitive switches may be utilized in connection with this invention. Particularly the diaphragm 23 or other pressure sensor may be combined with temperature sensitive means. It is an important feature of this invention that when the capacitor fails and no current is flowing therethrough, that the lamp 25 is energized to indicate to operating personnel that the capacitor is in a failed condition.

The pressure switch as illustrated and described above may also be connected into an electrical circuit whereby the failed capacitor not only provides a visual indication of failure, but is also removed from the electrical circuit. This is more particularly described in connection with FIG. 3.

Figure 3:
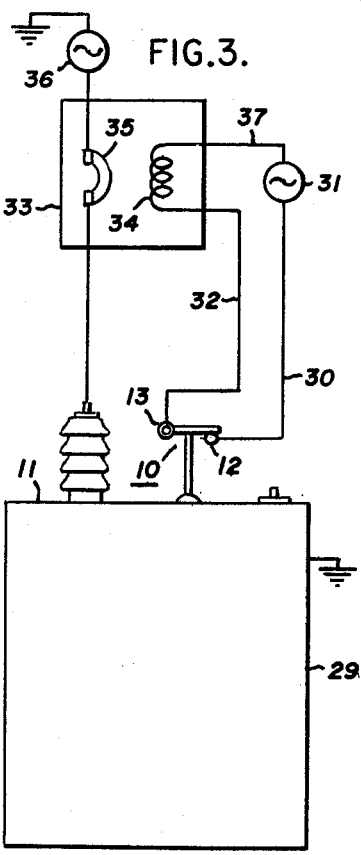
FIG. 3 discloses an electrical circuit involving the switch and safety circuit of this invention.

Referring now to FIG. 3 there is illustrated a capacitor 29 with a cover thereon 11. Cover 11 includes mounted thereon the pressure switch 10 of this invention. Pressure switch 10 is connected by means of lead 30 to a suitable source of control power 31. Lead 32 connects the other side of the pressure switch 10 to a control assembly 33. Control assembly 33 includes therein a trip coil 34 which is adapted to hold the contacts of interrupter 35 in a closed condition. Electrical power for the capacitor 29 is delivered to the capacitor 29 through appropriate leads from interrupter 35 from a power source 36 to appropriate terminals on the capacitor 29. The trip coil 34 is connected by means of lead 36 to the other side of the control power source 31. When the pressure switch 10 operates, as described with respect to FIG. 2, the circuit between terminals 12 and 13 is interrupted. This in turn interrupts the circuit through the undervoltage trip coil 34. With the trip coil out of the circuit the interrupter 35 mechanically operates to open the contact and thereby interrupt the circuit to the capacitor 29. This invention has thereby disclosed a safety device for large power capacitors wherein a normally closed switch is operated to open and thereby provide energy to an indicating lamp in the switch. At the same time the opening of the switch 10 can also cause through external circuitry an interruption or a breaking of the main circuit from a power source to the capacitor.

Figure 4:
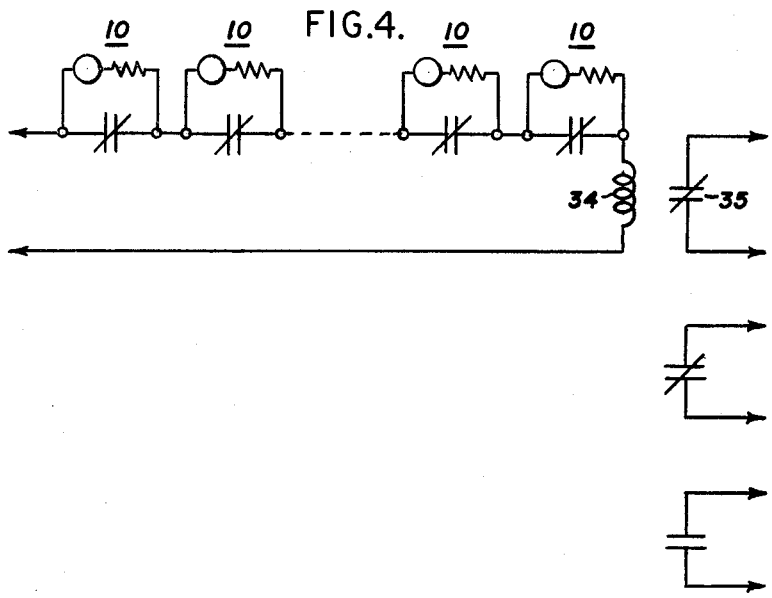
FIG. 4 illustrates a fail safe circuit embodying this invention.

This invention is also applicable to the circuit as illustrated in FIG. 4. Referring now to FIG. 4 there is illustrated a plurality of indicating switches 10 connected in wires with an undervoltage trip coil 34. Coil 34 operates contactor 35 to supply power to one or more capacitors. This is a fail safe circuit as is the one in FIG. 3 in that the failure of any element in the circuit causes the coil 34 to be deenergized to remove the capacitor from the line. The normal operation of a switch results in the energization of the lamps associated with the failed capacitor.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. In combination with an electrical capacitor, a safety device comprising
   a. an electrical switch means having a pair of electrical terminals projecting from said capacitor and adapted to be connected to a source of electrical power other than the power source connecting said capacitor,
   b. a pressure sensitive element connected to said switch means and adapted to sense a pressure rise in said capacitor,
   c. normally closed electrical contact means connected to said pressure sensitive element and adapted to be opened by a pressure increase in said capacitor,
   d. said contacts in their closed position providing an electrical circuit from one of said terminals through said contacts to the other of said terminals,
   e. an indicating means electrically connected across said terminals and in shunt with said circuit said indicating means being adapted not to be energized when said switch contacts are in their closed position.

2. The invention as recited in claim 1 wherein said electrical indicating means is a visual means.

3. The invention as recited in claim 2 wherein said visual means is a neon lamp.

4. The invention as recited in claim 3 wherein said pressure sensitive device is positioned within said capacitor.

5. The invention as recited in claim 4 wherein said pressure sensitive device is a diaphragm device wherein one of said contacts is positioned on said diaphragm.

6. A safety arrangement for an electrical circuit connected to an electrical capacitor to deliver power thereto comprising,
   a. an electrical circuit interrupter in said circuit and adapted to be electrically energized to hold said circuit in a closed position to deliver electrical power to said capacitor,
   b. normally operative mechanical means in said circuit interrupter to operate said circuit breaker,
   c. trip coil means adapted to hold said circuit interrupter in a closed position,
   d. a pressure sensitive device connected to said capacitor and to a second source of power,
   e. normally closed contact means on said pressure sensitive switch adapted to be open by an increase in pressure in said capacitor,
   f. and an electrical circuit interconnecting said pressure switch and said second power source and said trip coil whereby when said pressure switch operates to open said normally closed contacts, the power supply to said trip coil is interrupted and said mechanical means opens said circuit breaker.

7. A fail safe circuit for a plurality of capacitors connected to a power source comprising a separate switch means of claim 1 connected to each of said capacitors and connected in series with further power source and the operating coil of a circuit breaker, means connecting said circuit breaker to the power source of said capacitors.

* * * * *